J. H. MAPES.
ICE SAW.
APPLICATION FILED APR. 13, 1909.
956,812.
Patented May 3, 1910.
2 SHEETS—SHEET 2.
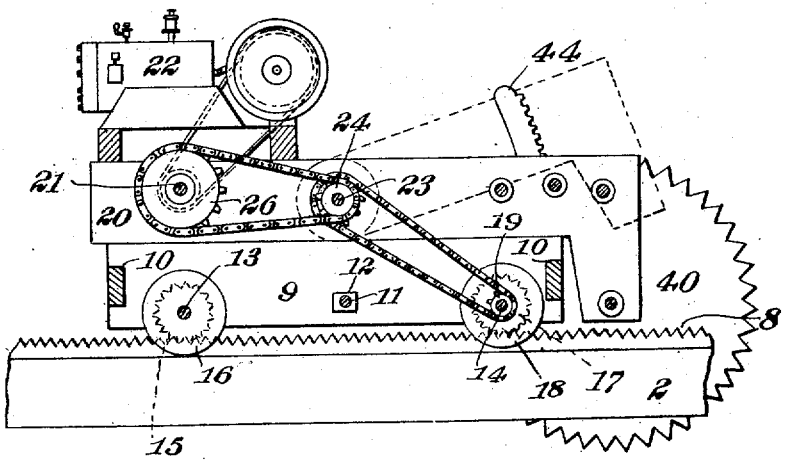
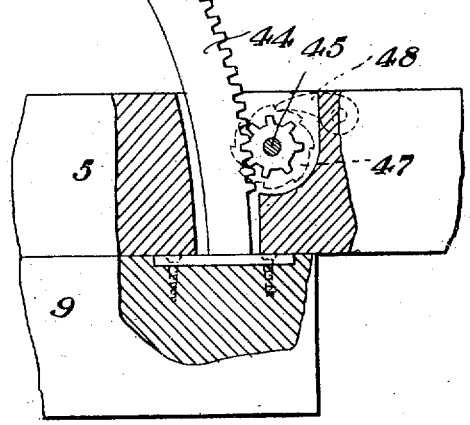
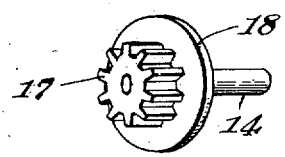
Witnesses
Inventor
John H. Mapes,
By
Attorneys

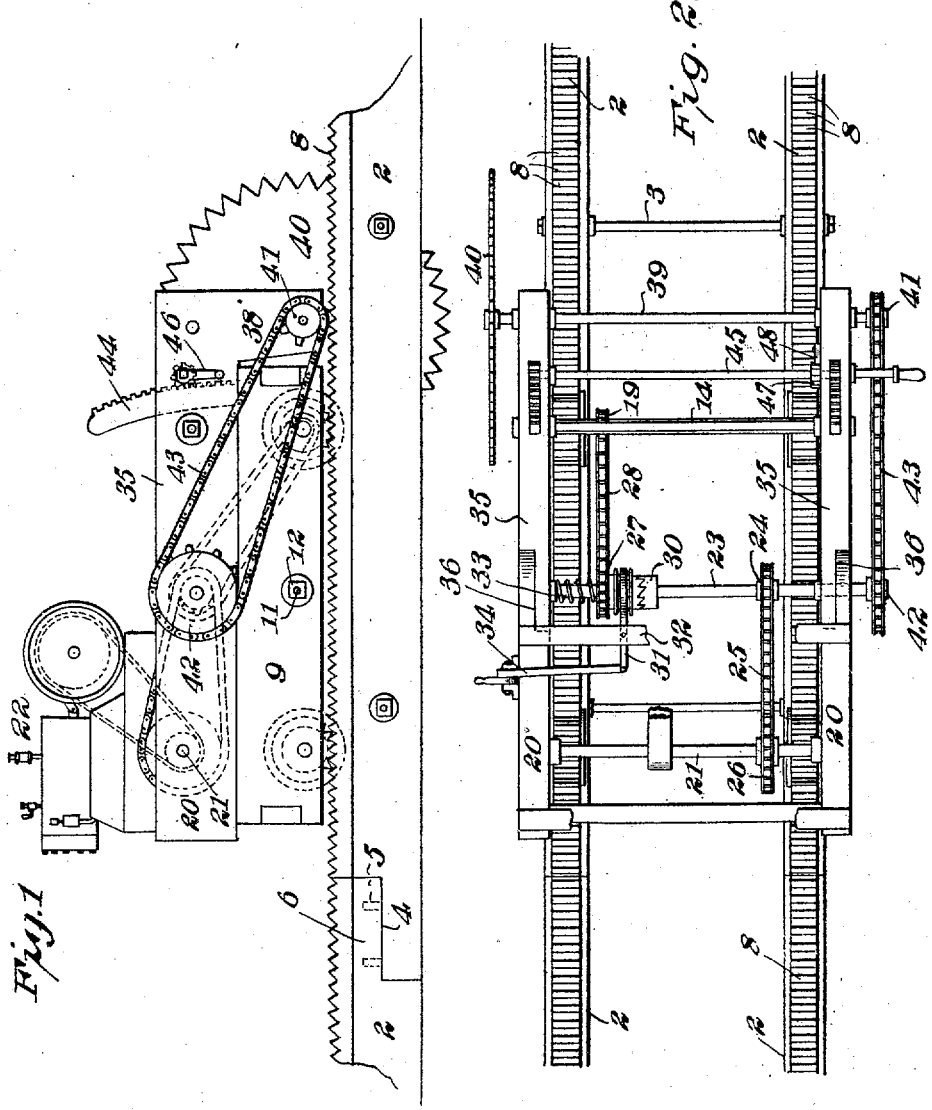

UNITED STATES PATENT OFFICE.

JOHN H. MAPES, OF BURLINGTON, IOWA.

ICE-SAW.

956,812.  Specification of Letters Patent.  Patented May 3, 1910.

Application filed April 13, 1909. Serial No. 489,579.

*To all whom it may concern:*

Be it known that I, JOHN H. MAPES, citizen of the United States, residing at Burlington, in the county of Des Moines and State of Iowa, have invented certain new and useful Improvements in Ice-Saws, of which the following is a specification.

My invention relates to a mechanism for cutting ice from fields, and particularly to a mechanism which is moved across the ice field in the direction of the cut and carries a saw which will cut vertically down into the ice in the same manner as the hand-operated saw and horse-operated plows in use today, only much more expeditiously.

The invention consists, generally speaking, in the use of a carriage having mechanism whereby it may be propelled across the ice, and preferably having a motor, such as a gasolene motor, for propelling it. This carriage carries a circular saw whose edge cuts into the ice, the saw being driven by the carriage motor. Preferably, in connection with the carriage, I use a sectional track which may be easily taken up behind the carriage and laid down in front of it, so that the machine may travel to any extent desired across the field.

For a full understanding of the invention and the merits thereof, and to acquire a knowledge of the details of construction, reference is to be had to the following description and accompanying drawings, in which:

Figure 1 is a side elevation of my improved machine; Fig. 2 is a plan view thereof; Fig. 3 is a longitudinal section; Fig. 4 is a fragmentary detail section, enlarged, of the adjusting rack; and, Fig. 5 is a perspective detail of the same.

Corresponding and like parts are referred to in the following description and indicated in all the views of the drawings by similar reference characters.

Referring to the drawings, 2—2 designates track sills which are spaced from each other and held to each other by means of the transverse spacing bars 3. These spacing bars may be of any desired construction, but preferably take the form of bolts having a pair of clamping nuts on both ends thereof, adapted to clamp the track section between them. Preferably, I form the track in two or more sections, each one of the sections being alike. The abutting ends of the two sections of the track are cut away so as to fit over and interlock with each other. As shown, I form the ends of one of the sections of track with a cut-away portion on its upper face, as at 4, and provide it with the upwardly projecting pins 5. The other section of track, on its lower face and at its end, is also cut away so that the end of the last named track section will fit over the end of the first named section. This cut-away portion is designated 6, and is provided with the holes wherein the pins 5 may fit. Thus, the two sections of track will be interlocked with each other against any longitudinal relative movement, but may be easily separated. Both ends of each of the track sections are formed in the same manner, so that the track may be taken up behind the carriage and laid down in front of it. I do not wish to be limited to any particular manner of connecting the track sections or preventing their longitudinal movement. The upper face of each of the sills of the track sections is formed with a toothed rail 8 of any desired character.

The saw is supported upon the carriage which consists of the two sidepieces 9 connected at their ends by the cross bars 10 and preferably connected at their middle by the brace 11, this brace preferably carrying means, such as the clamp nuts 12, whereby the two sidepieces may be drawn into solid engagement with the cross pieces. Mounted in the sidepieces 9 at opposite ends thereof, are the transverse shafts 13 and 14, the shaft 13 being an idle shaft and carrying at opposite ends the toothed wheels 15 which engage with the teeth on the rails 8. These toothed wheels 15 may be either loose on the shaft 13, or the shaft itself may rotate in bearings. The interior faces of the gears 15 are provided with the flanges 16 which engage with the sides of the rail 8 to keep the carriage on the track. The forward shaft 14 is rotatable and is the driven shaft. It carries at its ends the toothed gear wheels 17 having the flanges 18, and also carries a sprocket wheel 19, whereby the shaft is driven. It will be obvious that the rotation of the shaft 14 will drive the carriage over the rails 8.

Supported upon the sidepieces 9 of the carriage, are the sidepieces 20. These are rigidly fastened to the rear ends of the sidepieces 9 and carry between them the power shaft 21 which is driven by any suitable motor 22. This motor may be of any desired character, such as a gasolene engine, Mounted transversely in the forward ends of the sidepieces 20, is the countershaft 23 which carries a sprocket wheel 24 engaging with a sprocket chain 25 which passes over a driving sprocket wheel 26 on the shaft 21. The sprocket wheel 26 is of considerably larger diameter than the sprocket wheel 24. Mounted loosely on the shaft 23 is the sprocket wheel 27 which engages with a sprocket chain 28 which passes over a sprocket wheel 29 on the shaft 14. It will thus be seen that the power shaft 21 drives the countershaft 23 which in turn drives the propelling shaft 14. As before stated, the sprocket wheel 27 is loose on the shaft 23, but is provided on one side with one member of a clutch, the other member 30 of which is fixed on the shaft 23. A lever 31 is pivoted to a crosspiece 32 so that its end will engage with the sprocket wheel 27 and shift it out of engagement with the clutch member 30. A spring 33 surrounds the shaft and is adapted to force the shiftable sprocket wheel into engagement with the clutch member unless the sprocket wheel is held out of engagement therewith by the lever 31. This lever 31 is preferably provided with a link 34 which extends laterally to the side of the carriage where it may be easily operated.

The saw is carried on a pivoted frame composed of two sidepieces 35 which are pivoted at their rear ends to the forward ends of the sidepieces 20, the pivot of the sidepieces 35 being the shaft 23. Preferably, the front ends of the sidepieces 20 are cut away on their inside faces as at 36, while the outer faces of the sidepieces 35 are cut away in conformity thereto, so that the sidepieces will pivotally turn upon the shaft 23 around the ends of the sidepieces 20. At their forward ends the sidepieces 35 are downwardly turned, as at 38, to form supporting bearings for a saw mandrel 39 which carries at one end the circular ice saw 40 and at its other end carries a sprocket wheel 41 which is driven from a sprocket wheel 42 on the shaft 23 by means of a sprocket chain 43. It will be seen that as the sprocket wheel 42 is mounted on the pivot of the saw frame, the sprocket wheels 41 and 42 will always have the same relative distance, no matter whether the saw frame be elevated or depressed. It will also be obvious that a rotation of the shaft 23 from the power shaft 21 will rotate the saw blade, and inasmuch as the sprocket wheel 42 is of considerably larger diameter than the sprocket wheel 41, the latter will be revolved at a relatively high rate of speed. In order to raise and lower the saw frame, I preferably slot the sidepieces 35, and mount upon the upper faces of the forward ends of the sidepieces 9 the upwardly and rearwardly curved toothed bars 44. These are toothed on their outer edges for engagement with teeth on a shaft 45 which is carried in the forward ends of the sidepieces 35. By rotating this shaft, the saw frame will be raised or lowered, turning upon its pivotal axis, as described. The end of the shaft 45 is provided with a crank 46, whereby it may be operated, and the shaft is also provided with a ratchet 47 engageable by a pawl 48, whereby the shaft may be held in any rotative position, and thus the saw frame held in any adjusted position at any degree of elevation required.

The operation of my invention will be obvious. The track sections are laid down upon the ice in the direction of the cut, and the carriage placed upon the same. The motor is started up and the sprocket wheel 27 is thrown into engagement with the clutch on the shaft 23. Immediately this occurs, the carriage is propelled along the track, and at the same time the saw is rotated, cutting into the ice. It will be seen that at any time that it is desired to stop the carriage, it is only necessary to throw the clutch to disengage the driving sprocket from the countershaft. By elevating the saw frame, the saw may be entirely cleared from the ice, or be lowered to give a sufficient depth of cut.

While I have shown a construction which is practical and effective, I do not wish to be limited to the details thereof, as it is obvious that they may be changed in many ways without departing from the spirit of the invention.

Having thus described the invention, what is claimed as new is:—

1. In an apparatus of the character described, a carriage, toothed driving wheels upon which the carriage is supported and by which it is propelled, a power shaft, a countershaft mounted parallel to the power shaft, gearing between the power shaft and the countershaft, a sprocket wheel freely rotatable upon the countershaft, a clutch connecting the sprocket wheel to its shaft, a shaft on which the propelling wheels are mounted, a sprocket wheel thereon, a sprocket chain connecting said last named sprocket wheel with the sprocket wheel on the countershaft, a frame pivoted upon the carriage for vertical movement, a saw mandrel carried thereon, a saw on the mandrel, a sprocket wheel on the countershaft, and a chain connecting the mandrel sprocket wheel and the countershaft sprocket wheel.

2. In an apparatus of the class described, a carriage composed of spaced side pieces, axles carried in the side pieces and having toothed propelling wheels, a power shaft, an intermediate shaft, connections between the power shaft and the intermediate shaft, connections between the intermediate shaft and one of said axles, means for throwing the axles out of gear with the intermediate shaft, opposed saw frames pivoted upon the carriage, the axial center of the saw-carrying frame being coincident with the said intermediate shaft, the end of said saw-carrying frame extending beyond the end of the carriage and projecting downward, a mandrel carrying a saw and mounted in the pivoted saw frame, in the downwardly projecting ends thereof, a sprocket wheel on the end of said mandrel, a sprocket wheel on said intermediate shaft, a sprocket chain connecting the two wheels, upwardly and rearwardly extending curved bars mounted in the saw frame, said bars being toothed, a shaft in the saw frame having gears engaging the toothed bars, and a pawl and ratchet mechanism for holding the shaft from rotation.

In testimony whereof I affix my signature in presence of two witnesses.

JOHN H. MAPES. [L. S.]

Witnesses:
C. L. BARTLETT,
H. SCHLEMER.